(No Model.)

C. E. ALBRO.
HOISTING MACHINE.

No. 316,718. Patented Apr. 28, 1885.

Attest
Homer A. Herr.
James Barber.

Inventor
Chas. E. Albro
By his atty

UNITED STATES PATENT OFFICE.

CHARLES E. ALBRO, OF PHILADELPHIA, PENNSYLVANIA.

HOISTING-MACHINE.

SPECIFICATION forming part of Letters Patent No. 316,718, dated April 28, 1885.

Application filed December 19, 1884. (No model.)

*To all whom it may concern:*

Be it known that I, CHARLES E. ALBRO, of the city and county of Philadelphia, and State of Pennsylvania, have invented a new and useful Improvement in Hoisting-Machines, of which the following is a specification.

My invention has reference to hoisting-machines; and it consists in improvements by which the winding-drum is automatically stopped upon any accidental arresting of the downward movement of the cage or platform, as is fully set forth in the following specification, and shown in the accompanying drawings, which form part thereof.

The object of this invention is to automatically stop the unwinding of the elevator-drum and thereby prevent accident by breaking of the cable or falling of the cage, which might occur from the said cage being accidentally arrested in its downward movement from pinching of the vertical guide-posts, the block or obstruction extending over the hatchway, or from any other cause. It is readily seen that should the cage be arrested for a short period of time while the drum is still unwinding the cable, there would be sufficient slack cable to allow the cage to fall a considerable distance should the cause of its obstruction be suddenly removed or overpowered, and this falling of the cage would be liable to snap the cable and allow the cage with its contents to fall to the ground. By this improvement the drive-belt, whose function is to lower the cage, is automatically shifted so as to arrest further unwinding of the drum the instant the cable commences to become slack, thus successfully obviating any possibility of there being sufficient slack cable to cause the least danger.

Figures 1, 2:
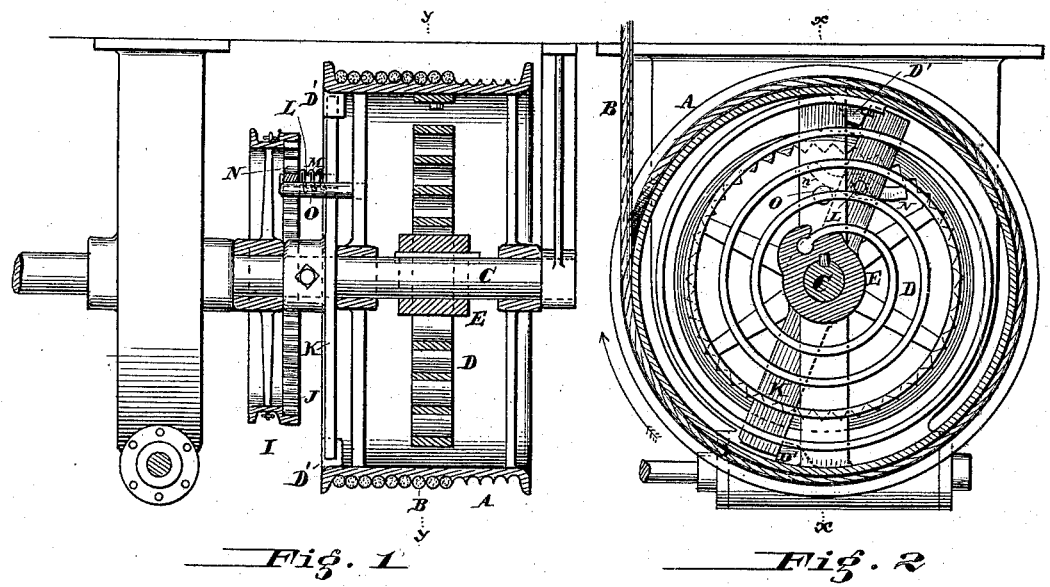
Figure 3:
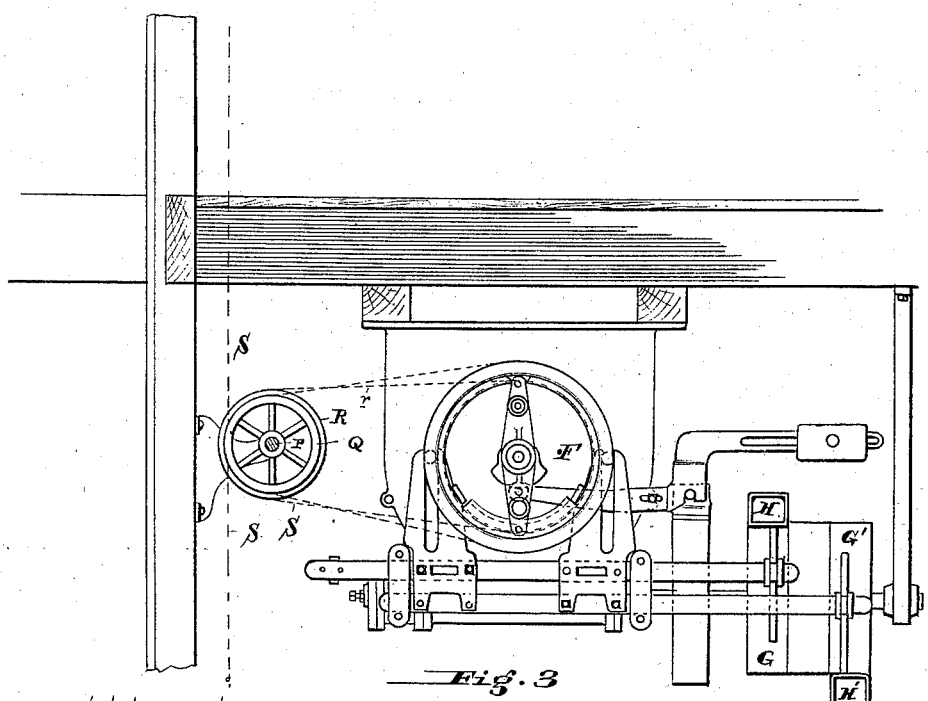

In the drawings, Figure 1 is a sectional elevation of part of the power mechanism on line X X, as shown by the improved mechanism for automatically arresting the unwinding of the cable upon the cage becoming obstructed in its descent. Fig. 2 is a cross-section of same on line Y Y. Fig. 3 is a side elevation of the power mechanism as an entirety.

A is a winding-drum, and is supported loosely upon the driving-shaft C, and is connected thereto by a coil-spring, D, one end of which is secured to the drum, and the other end to a hub, E, secured upon the shaft C.

F represents the shifting mechanism for stopping and starting the rotation of the drum, and also reversing its direction of movement.

G and G' are two drive-wheels for receiving the bands or belts, and H H' are the shifting-loops for shifting said belts in the well-known manner.

S is the shifting-chain, and passes around a loose pulley, Q, by which it may be guided vertically up and down parallel with the elevator-guideway for the cage.

I is an auxiliary shifting-wheel, about which the chain $r$ passes and connects it with the wheel R, secured to the same shaft P with the wheel Q, above referred to, so that the moving of wheel I will insure a similar movement of the shaft-wheel, or, if preferred, both the shifting-wheel and wheel I may be located on the same side of the machine; or, if desired, they may be made integral. This wheel I is provided with teeth J, which are preferably made V-shaped, whereby it may be used for a right or left hand machine.

K is an arm rigidly secured to the shaft C, and adapted to rotate upon lugs D' upon the drum D when in normal running position and when the drum is fully loaded. This arm is provided with a stud, L, upon which is journaled a pawl, N, having its rear end curved, as at $n$, and adapted to mesh with the teeth J of the wheel I, being pressed toward said teeth by a spring, M.

O is a pin carried by the drum A or one of its arms, and is adapted to strike the end $n$ of the pawl N and throw it out of contact just as the lugs D' receive the arm K and thus throw the pawl out of contact with the teeth J of the wheel I, as shown in Fig. 2.

B represents the cable.

The operation is as follows: In the normal working of the elevator various parts are in the relative positions as shown in Figs. 1 and 2, in which it will be noticed the pawl N is out of contact with the auxiliary shifting-wheel I, which is therefore loose upon the shaft C, and does not interfere with the ordinary operation of the shifting apparatus by hand, and the spring D is under tension, and, though not sufficiently strong to support the cage and its load, it is of sufficient strength to wind up and thereby take in all slack in the cable should the cage be accidentally arrested while being lowered. In shifting the cage the arm K presses against the lugs D' of the drum A, and causes said drum to be positively rotated, just as if it were rigidly secured to the shaft C. When rotating in the other direction, so as to lower the cage, the weight of the cage and its load causes the spring D to remain under tension, and keeps the lugs D' against the arm K, thus preventing the drum rotating with a greater velocity than is imparted to the shaft C. Now, should the cage become accidentally arrested in its downward movement from any cause whatever, the tension on cable B would become greatly reduced, and the spring D would now have power to wind up the cable; but as there is no loose cable the said spring D causes the drum A to remain stationary, while the shaft still rotates, causing the arm K to leave the lugs D' and move the pawl N away from the pin O, thereby allowing it to be thrown in contact with the teeth J of the auxiliary shifting-wheel I, and by which a further movement of the shaft C instantly operates the shifting mechanism and arrests further movement of the driving-shaft C or power mechanism as an entirety.

While the construction shown is preferred, it is self-evident that so far as the details are concerned it might be greatly modified. For instance, in place of the coil-spring D, a helical spring, curved so as to fit within the cylinder of the drum, may be used, and various other parts would have to be changed to suit power-elevators of various makes. It is therefore understood that this invention is not to be limited to the precise construction shown.

Having now described my invention, what I claim as new, and desire to secure by Letters Patent, is—

1. In a power-elevator, the combination of the winding-drum and shifting mechanism for the driving-belts, with auxiliary mechanism, substantially as set forth, by which any tendency of the cable becoming slack will automatically operate the shifting mechanism to stop the machine, substantially as and for the purpose specified.

2. In a hoisting-machine, a driving-shaft, in combination with a drum for the cable supported loosely thereon, and a spring connecting said shaft with said drum, substantially as and for the purpose specified.

3. In a hoisting-machine, a driving-shaft, in combination with a drum for the cable supported loosely thereon, and provided with lugs or stops, a spring connecting said shaft with said drum, and an arm secured to said shaft and arranged to press against said lugs on the drum, substantially as and for the purpose specified.

4. In a hoisting-machine, a driving-shaft, in combination with a drum for the cable supported loosely thereon, and provided with lugs or stops and a pin, a spring connecting said shaft with said drum, an arm secured to said shaft and arranged to normally press against said lugs on the drum, and provided with a spring-pawl adapted to be acted upon by the pin on the drum, and a shifting-wheel provided with ratchet-teeth for the reception of said pawl when freed from the action of said pin, substantially as and for the purpose specified.

5. In a hoisting-machine, shifting mechanism for the belts, a driving-shaft in combination with a drum for the cable supported loosely thereon, and provided with lugs or stops and a pin, a spring connecting said shaft with said drum, an arm secured to said shaft and arranged to normally press against said lugs on the drum, and provided with a spring-pawl adapted to be acted upon by the pin on the drum, and an auxiliary shifting-wheel provided with ratchet-teeth for the reception of said pawl when freed from the action of the said pin and connected with the shifting mechanism proper, substantially as and for the purpose specified.

6. In a hoisting-machine, the combination of shaft C, drum A, and spring D, substantially as and for the purpose specified.

7. In a hoisting-machine, the combination of shaft C, drum A, having lugs D', and pin O, spring D, and arm K, having pawl L, and wheel I, having ratchet-teeth J, substantially as and for the purpose specified.

8. In a hoisting-machine, the combination of shaft C, drum A, having lugs D' and pin O, spring D, and arm K, having pawl L, and wheel I, having ratchet-teeth J, shifting mechanism F, chains S and r, and wheels Q R, connected together, substantially as and for the purpose specified.

In testimony of which invention I hereunto set my hand.

CHARLES E. ALBRO.

Witnesses:
R. M. HUNTER,
WILLIAM C. MAYNE.